US007873041B2

(12) United States Patent
Lee et al.

(10) Patent No.: US 7,873,041 B2
(45) Date of Patent: Jan. 18, 2011

(54) METHOD AND APPARATUS FOR SEARCHING FORWARDING TABLE

(75) Inventors: Won-Kyoung Lee, Daejeon (KR); Jae-Woo Park, Daejeon (KR); Young-Sik Chung, Daejeon (KR); Yoo-Kyoung Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 406 days.

(21) Appl. No.: 11/947,353

(22) Filed: Nov. 29, 2007

(65) Prior Publication Data
US 2008/0133494 A1 Jun. 5, 2008

(30) Foreign Application Priority Data
Dec. 1, 2006 (KR) ............... 10-2006-0121046
Sep. 27, 2007 (KR) ............... 10-2007-0097487

(51) Int. Cl.
*H04L 12/28* (2006.01)
*H04L 12/56* (2006.01)
(52) U.S. Cl. .................... 370/389; 370/395.7
(58) Field of Classification Search .......... None
See application file for complete search history.

(56) References Cited

U.S. PATENT DOCUMENTS

| | | | |
|---|---|---|---|
| 5,748,905 A * | 5/1998 | Hauser et al. | 709/249 |
| 6,266,705 B1 | 7/2001 | Ullum et al. | |
| 6,457,058 B1 * | 9/2002 | Ullum et al. | 709/238 |
| 2002/0085554 A1 | 7/2002 | Park | |
| 2004/0001492 A1 * | 1/2004 | Johnson | 370/395.32 |
| 2004/0148487 A1 * | 7/2004 | Mori et al. | 711/216 |
| 2008/0056278 A1 * | 3/2008 | Kadambi et al. | 370/395.53 |

FOREIGN PATENT DOCUMENTS

| | | |
|---|---|---|
| JP | 2000-156708 | 6/2000 |
| JP | 2005-236997 | 9/2005 |
| KR | 1020000013760 A | 3/2000 |
| KR | 1020040067187 A | 7/2004 |

OTHER PUBLICATIONS

Lim, Hyesook et al., "A Parallel Multiple Hashing Architecture for IP Address Lookup", *IEEE*, pp. 91-95 (2004).

* cited by examiner

*Primary Examiner*—Chirag G Shah
*Assistant Examiner*—Srinivasa R Reddivalam (57) ABSTRACT

A method and apparatus for searching a forwarding table are provided. The apparatus includes: a data storage unit storing a forwarding table including a plurality of forwarding entries aligned in the order of MAC address values and stored in each group after being classified into a plurality of groups and a plurality of forwarding databases having hash keys corresponding to the groups and; a hashing unit transforming an externally input MAC address into a hash key and selecting a search group and a search-forwarding entry by respectively using some bits and the other bits of the hash key; and a port information output unit outputting output port information of the search-forwarding entry, when the input MAC address is the same as a MAC address extracted from the search-forwarding entry and outputting output port information after searching and acquiring a forwarding entry having the input MAC address while dividing a search area in the search group, when the input MAC address is different from the extracted MAC address. Accordingly, it is possible to speedily search a forwarding table.

7 Claims, 9 Drawing Sheets

| Bits 31 — 16 | Bits 16 — 0 |
|---|---|
| Total number of entries in the hash list | |
| Number of dynamic entries in the hash list | |
| Configured aging time | |
| Actual value of aging time | |
| Forwarding database ID (FID) | Spanning Tree group ID |
| A count of VLANs connected to this forwarding database | Reserved |
| Pointer to the next free entry on the hash reserve table | |
| Count of available free entries in the reserve table | |
| Total number of packets forwarded | |
| Total number of packets discarded | |
| hash table | |

FIG. 4

| 31 | 30 | 29 | | 16 | | 0 |
|---|---|---|---|---|---|---|
| Valid | forbidden | Spanning Tree group ID | | | Entry type | Entry flag |
| VLAN ID | | | | Source port ID | | |
| index | | | | Fabric port ID | | |
| MAC address | | | | | | |
| MAC address | | | | Forwarding database ID | | |
| Time stamp | | | | | | |
| Pointer to the next entry on the hash list | | | | | | |
| SA reference used by L2 filtering module | | | | | | |
| DA reference used by L2 filtering module | | | | | | |
| Reference used by the packet manager | | | | | | |
| Pointer to set of output L2 port IDs for multicast | | | | | | |

METHOD AND APPARATUS FOR SEARCHING FORWARDING TABLE

CROSS-REFERENCE TO RELATED APPLICATIONS

This application claims the priority of Korean Patent Application No. 10-2006-0121046 filed on Dec. 1, 2006 in the Korean Intellectual Property Office and Korean Patent Application No. 10-2007-0097487 filed on Sep. 27, 2007 the disclosure of which is incorporated herein by reference.

BACKGROUND OF THE INVENTION

1. Field of the Invention

The present invention relates to a method and apparatus for searching a forwarding table, and more particularly, to a method and apparatus for searching a forwarding table capable of effectively searching for and managing forwarding information for allowing a network switch to transmit a frame to a desirable port among a plurality of ports.

This work Was supported by the IT R&D program of MIC/IITA[2005-S-102-02, Carrier Class Ethernet Technology].

2. Description of the Related Art

A network switch included in a communication network needs a forwarding searching engine and address translation mechanism so as to receive data from another network equipment and transmit the data to a desirable port.

Since the performance of the network switch is largely influenced by a speed of determining a forwarding path, the efficiency and the speed of the forwarding searching engine and the address translation mechanism are main factors for determining the performance of the network switch.

In general, in order to reduce a searching time, the network switch includes a hash unit for transforming a search key having a large number of bits into an index value having a small number of bits. Accordingly, it is possible to acquire an appropriate forwarding entry by searching the forwarding table with the hash index of less length than the original search key.

Figure 1:
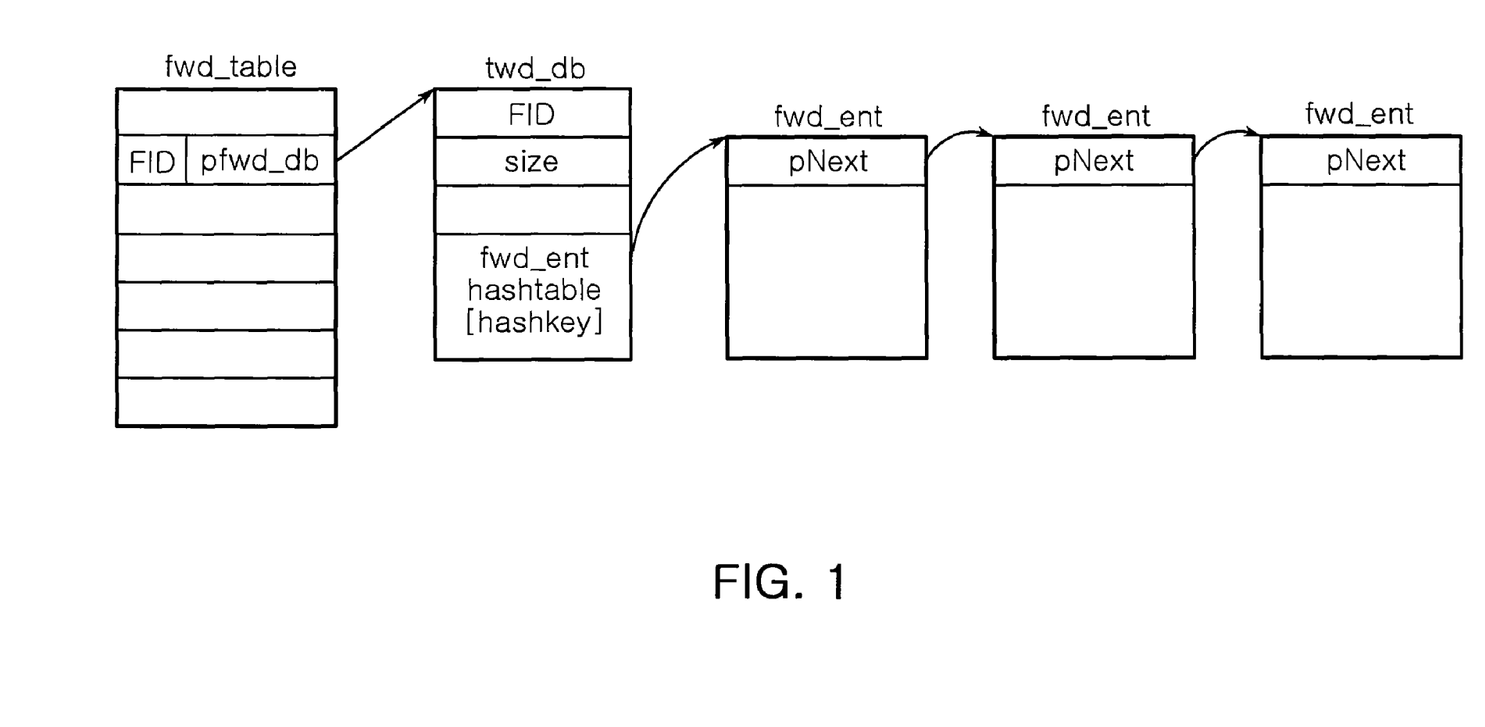
FIG. 1 illustrates a concept of an operation of an apparatus for searching a forwarding table according to a conventional example.

FIG. 1 illustrates a concept of an operation of an apparatus for searching a forwarding table according to a conventional example. The apparatus for searching the forwarding table of FIG. 1 selects a forwarding entry fwd_ent in a forwarding table fwd_table and compares a media access control (MAC) address of the selected entry with an input MAC address. When the MAC address of the selected entry is the same as the input MAC address, output port information of the selected forwarding entry fwd_ent is read. Otherwise, the MAC address of the next forwarding entry fwd_ent sequentially is compared with the input MAC address to obtain the output port information.

At this time, the forwarding entries are not aligned based on a predetermined rule but aligned in the order to storing the forwarding entries.

Accordingly, in this sequential searching method, since information of all the forwarding entries fwd_ent has to be read and compared, it takes too much time to determine a forwarding path.

In order to complement this disadvantage, in U.S. Pat. No. 6,266,705, as shown in FIG. 2, a method of searching for an appropriate forwarding entry and sorting a plurality of forwarding entries into several pages by using a dual hashing technique is suggested.

Figure 2:
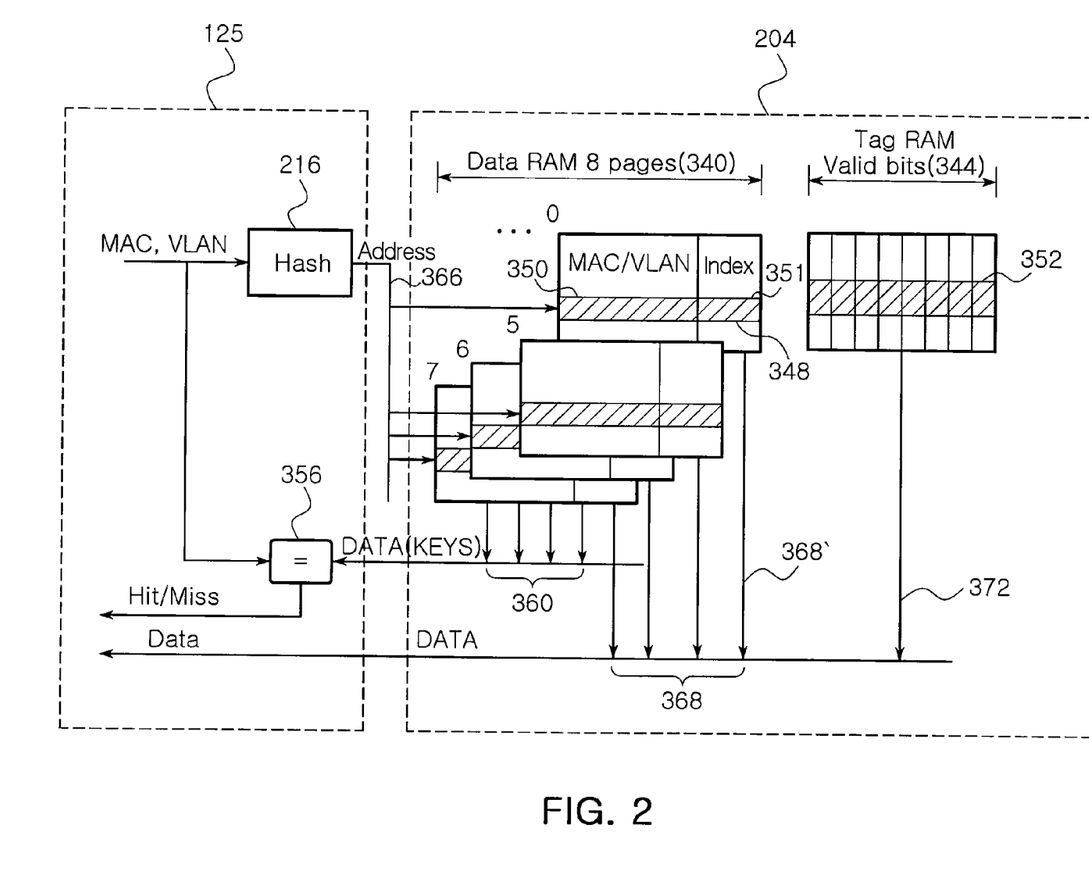
FIG. 2 illustrates a concept of an operation of an apparatus for searching a forwarding table according to another conventional example.

In a method of FIG. 2, a page to be searched by using the most significant bits (MSB) of 3 bits of a hash key is firstly selected, and forwarding entries in the page are sequentially searched.

Accordingly, in the method of FIG. 2, the searching time is largely reduced as compared with the existing sequential searching method. However, the searching speed decreases in proportion to the number of forwarding entries included in the page.

SUMMARY OF THE INVENTION

In the searching method in U.S. Pat. No. 6,266,705, a searching time is relatively short. However, it is disadvantageous that a searching speed is reduced in proportion to the number of forwarding entries included in a corresponding page.

According to an aspect of the present invention, there is provided an apparatus for searching a forwarding table, the apparatus comprising: a data storage unit storing a forwarding table including a plurality of forwarding entries aligned in the order of MAC address values and stored in each group after being classified into a plurality of groups and a plurality of forwarding databases having hash keys corresponding to the groups and; a hashing unit transforming an externally input MAC address into a hash key and selecting a search group and a search-forwarding entry by respectively using some bits and the other bits of the hash key; and a port information output unit outputting output port information of the search-forwarding entry, when the input MAC address is the same as a MAC address extracted from the search-forwarding entry and outputting output port information after searching and acquiring a forwarding entry having the input MAC address while dividing a search area in the search group, when the input MAC address is different from the extracted MAC address.

In the above aspect of the present invention, the port information output unit may include: an equation comparator outputting the output port information of the search-forwarding entry, when the input MAC address is the extracted MAC address; an inequality comparator acquiring a new forwarding entry by dividing the search area in the search group, when the input MAC address is different from the extracted MAC address; and a searching location movement unit moving to the new search-forwarding entry.

In addition, the inequality comparator may search for the new search-forwarding entry having an index index_cur that is calculated according to an equation of "index_init+(index_final−index_init)/2" after setting the extracted MAC address to an initial index value index_init, when the input MAC address is greater than the extracted MAC address and setting the extracted MAC address to a final index value index_final, when the input MAC address is less than the extracted MAC address.

In addition, each of the plurality of forwarding databases may include a forwarding database ID and information on a hash table indexed by using a hash key that is mapped in correspondence with a group and a forwarding entry. Each of the plurality of forwarding entries may include the MAC address, information on information validity, output port information, a virtual LAN ID, and information on a pointer for representing a location of the next forwarding entry.

According to another aspect of the present invention, there is provided a method of searching for forwarding information, the method comprising: constructing a plurality of forwarding entries which are aligned in the order of MAC address values and stored in each group after being classified into a plurality of groups and a plurality of forwarding databases having hash keys corresponding to the groups and the forwarding entries; transforming an input MAC address into a hash key, when the MAC address is externally input, and selecting a search group and a search forwarding entry by respectively using some bits and the other bits of the hash key; extracting a MAC address from the search-forwarding entry and extracting and outputting output port information of the search-forwarding entry, when the extracted address is the same as the input MAC address; and outputting the output port information after newly searching for a forwarding entry having the input MAC address while dividing a search area in the search group, when the extracted address is different from the input MAC address.

In the above aspect of the present invention, the outputting of the port information may include: setting the extracted MAC address to an initial index value index_init, when the input MAC address is greater than the extracted MAC address and setting the extracted MAC address to a final index value index_final, when the input MAC address is less than the extracted MAC address; moving to the new search-forwarding entry having an index calculated based on an equation of "index_init+(index_final−index_init)/2"; and outputting output port information of the new search-forwarding entry, when the MAC address of the new search-forwarding entry is the same as the input MAC address and returning to the setting of the extracted MAC address, when the MAC address of the new search-forwarding entry is different from the input MAC address.

In addition, the aligning of the forwarding entry may include: determining whether to add or delete the forwarding entry having the input MAC address; adding the forwarding entry at a location of a final index after increasing an index value of a forwarding entry which is greater than that of the modified index by one unit, when adding the forwarding entry; and deleting the forwarding entry after setting the final index value to the modified index, when deleting the forwarding entry and decreasing the index value of the forwarding entry which is greater than that of the modified index by one unit.

Accordingly, in the method and apparatus for searching a forwarding table, it is possible to speedily search for a desirable forwarding entry by using the dual hashing technique and the divide-and-conquer technique after classifying forwarding entries into a plurality of groups and aligning forwarding entries in each group in the order of MAC addresses. Thus, it is possible to improve the performance of a network switch.

In addition, in the present invention, although a forwarding entry is added or deleted, the alignment order of the forwarding entries is maintained. Thus, it is possible to effectively manage the forwarding table.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 3:
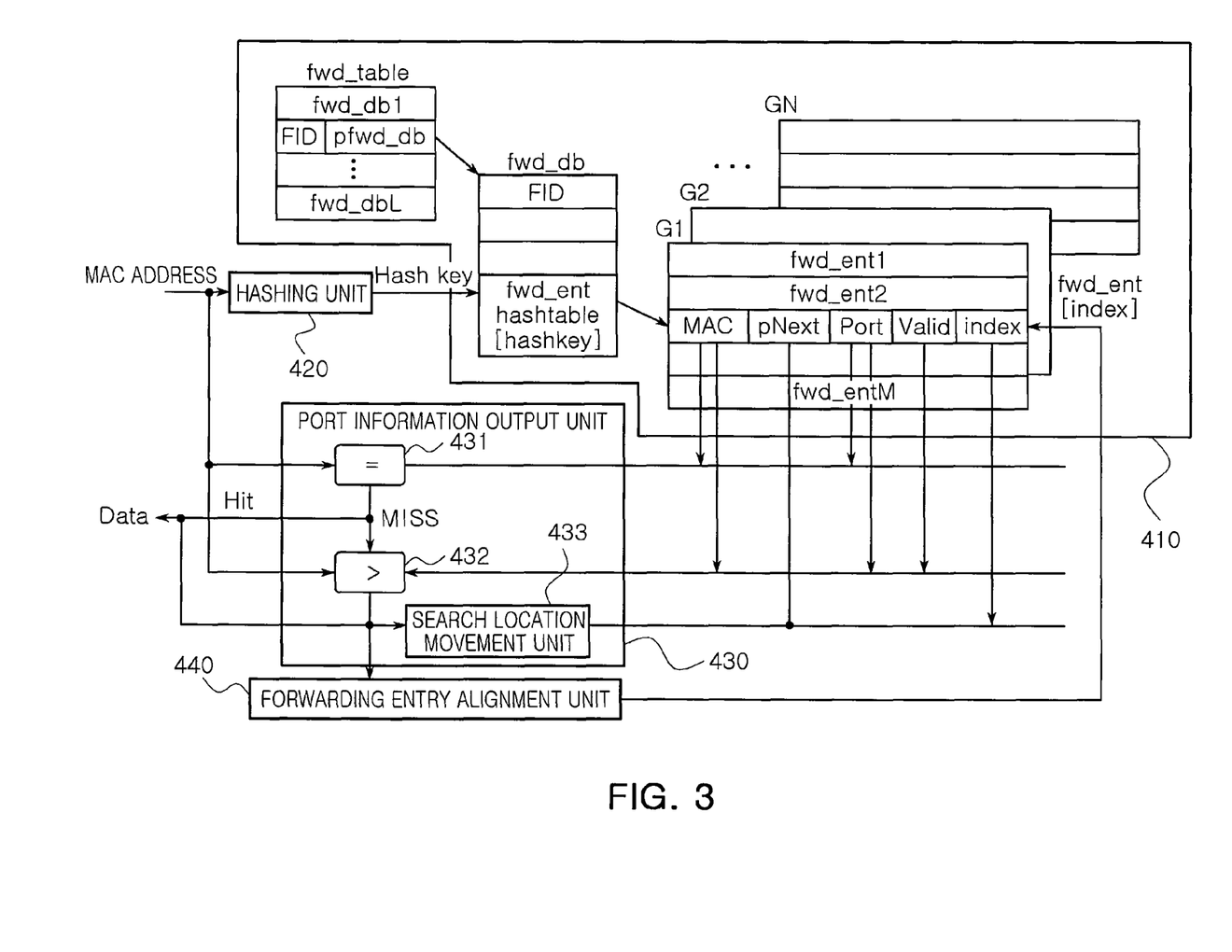
FIG. 3 illustrates a structure of an apparatus for searching a forwarding table according to an embodiment of the present invention.

FIG. 3 illustrates a structure of an apparatus for searching a forwarding table according to an embodiment of the present invention.

Referring to FIG. 3, the apparatus for searching the forwarding table includes a data storage unit 410, a hashing unit 420, a port information output unit 430, and a forwarding entry alignment unit 440.

The data storage unit 410 stores a forwarding table fwd_table. The forwarding table fwd_table has two data structures that are a forwarding database fwd_db and a forwarding entry fwd_ent. A plurality of forwarding entries fwd_ent are classified into a plurality of groups based on some bits of a hash key and sequentially stored in the order of MAC address values.

At this time, the forwarding table fwd_table is indexed with a forwarding database ID (hereinafter, FID). The forwarding table fwd_table stores pointers pfwd_db for representing the locations of the forwarding databases fwd_db corresponding to FIDS.

Figure 4:
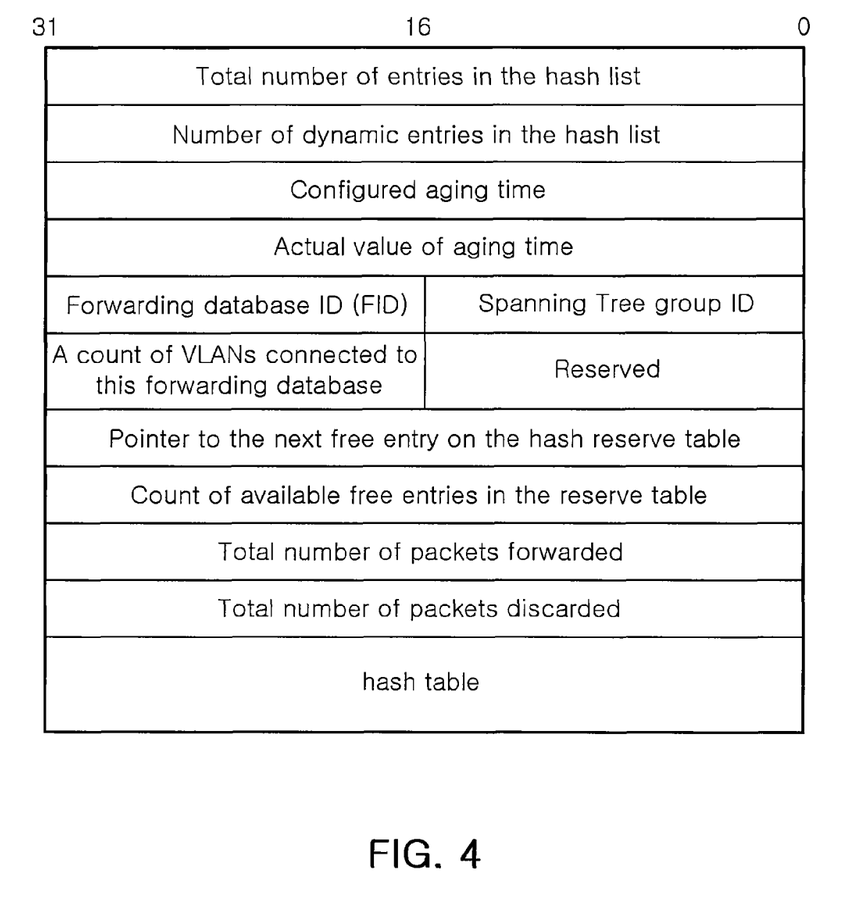
FIG. 4 illustrates a data structure of a forwarding database of FIG. 3.
Figure 5:
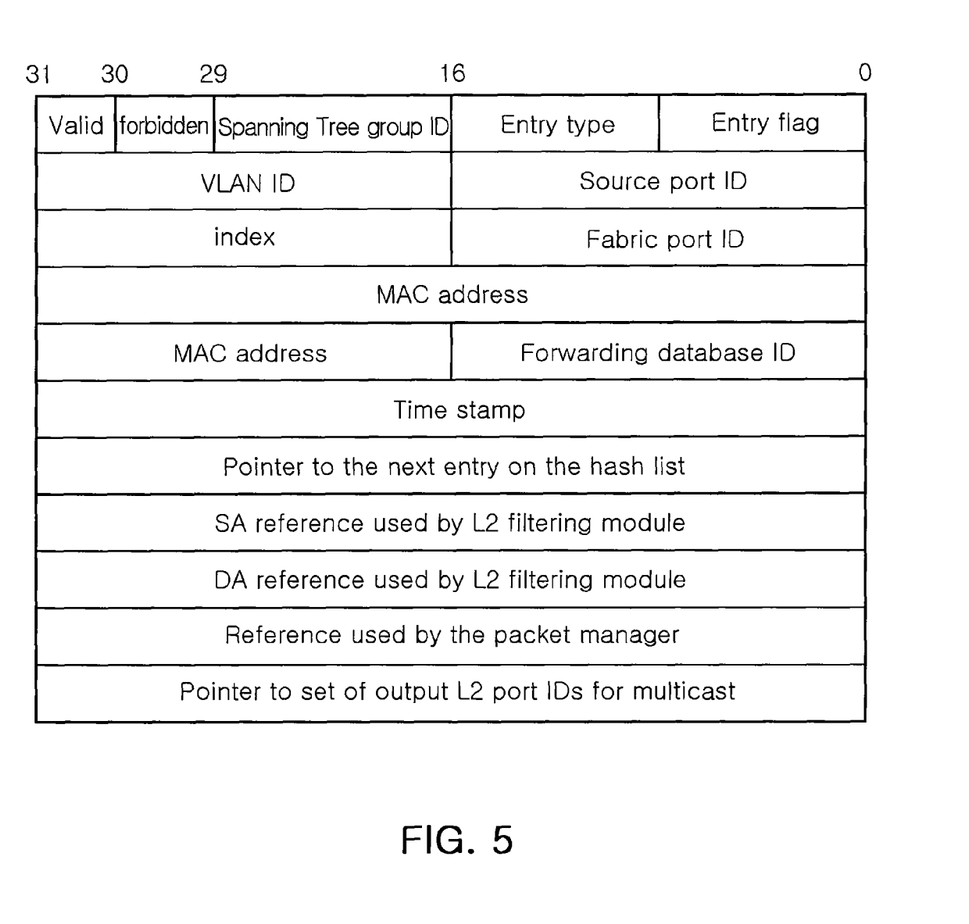
FIG. 5 illustrates a data structure of a forwarding entry of FIG. 3.

Each forwarding database fwd_db has a structure of FIG. 4. Each forwarding database fwd_db stores an FID and information on a hash table indexed with a hash key mapped so as to indicate a corresponding forwarding entry. Each forwarding entry fwd_ent has a structure of FIG. 5. Each forwarding entry stores information such as an MAC address, validity information, output port information (pointer to set output L2 port ID), a virtual LAN ID (VLAN ID), and a pointer for representing a location of the next forwarding entry (pointer to the next entry).

After transforming a MAC address in an externally input frame into a hash key with small number of bits, the hashing unit 420 selects a searching group from among a plurality of groups and selects a search-forwarding entry from the selected group by using a dual hashing technique.

That is, the hashing unit 420 selects a search group by using some bits of the hash key and selects a search-forwarding entry by using the other bits.

Figure 6:
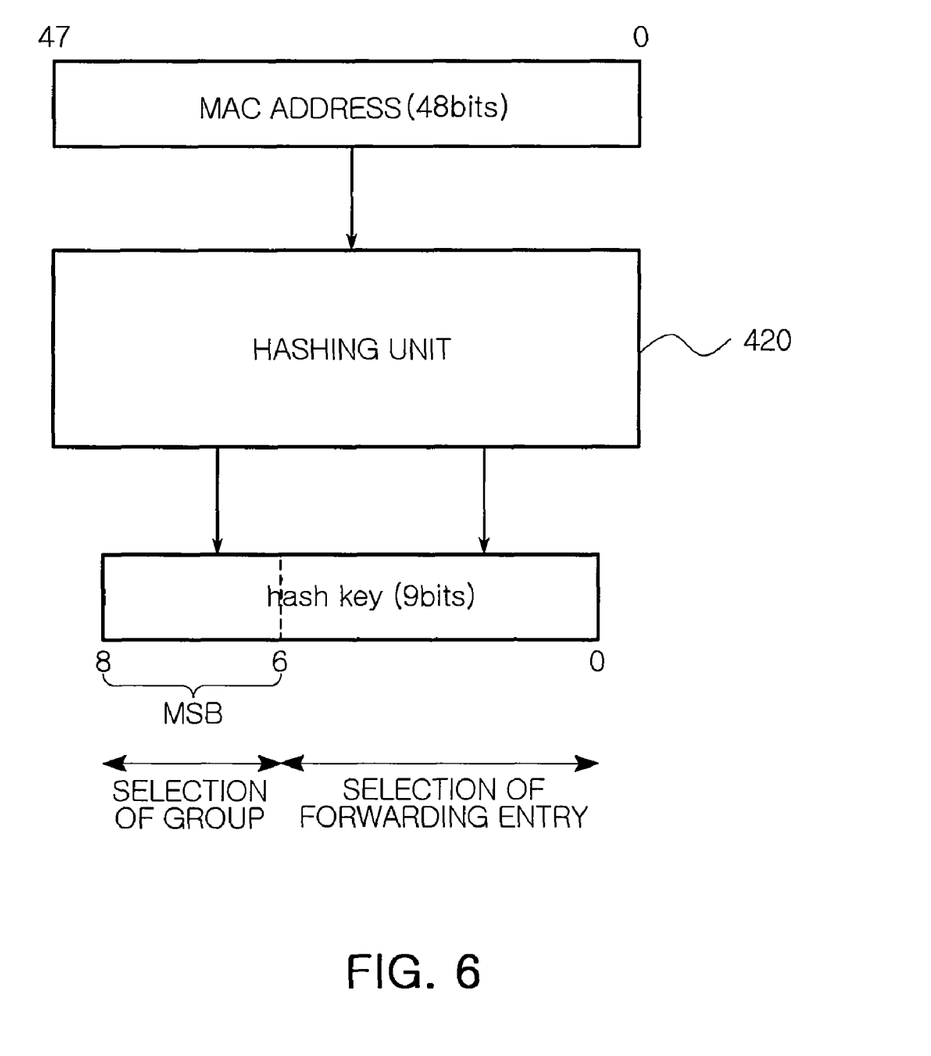
FIG. 6 illustrates a concept of an operation of a hashing unit of FIG. 3.

For example, the plurality of forwarding entries fwd_ent are classified into eight groups. When the forwarding table fwd_table is constructed so that each group stores sixty four forwarding entries, as shown in FIG. 6, the hashing unit 420 according to the embodiment of the present invention selects a group by using MSB of 3 bits of a hash key and selects a forwarding entry from the selected group by using the remaining six bits.

When the MAC address of the forwarding entry selected by the hashing unit 420 is the same as an input MAC address, the port information output unit 430 output the output port information of the selected forwarding entry. When the MAC address of the forwarding entry selected by the hashing unit 420 is different from the input MAC address, after searching for and obtaining a new forwarding entry having the input MAC address while dividing a searching area in the searching group by two by using a divide-and-conquer technique, the output port information thereof is output.

The port information output unit 430 includes equation and inequality comparators 431 and 432 for outputting an output port by determining whether the input MAC address is the same as the MAC address of the search-forwarding entry and determining which one is greater than the other or searching for a new forwarding entry by dividing the search area by two, and a search location movement unit 433 for moving a search location to a new search-forwarding entry based on the operation result of the equation and inequality comparators 431 and 432.

The forwarding entry alignment unit 440 serves to add or delete forwarding entries in the order of MAC addresses. For example, when adding a forwarding entry, the forwarding entry alignment unit 440 sets a final index index_final to a modified index index_modified and increases the index value of the forwarding entry which is greater than that of the modified index index_modified by one unit. On the other hand, when deleting a forwarding entry, the forwarding entry alignment unit 440 sets an index of the forwarding entry to be deleted to a modified index index_modified. Then, the forwarding entry alignment unit 440 deletes the forwarding entry and decreases the index value of the forwarding entry which is greater than that of the modified index index_modified by one unit.

That is, when adding a forwarding entry, a storage position of a forwarding entry with an index greater than that of the added forwarding entry is backwardly shifted by one position. When deleting the forwarding entry, a storage position of a forwarding entry with an index greater than that of the deleted forwarding entry is forwardly shifted by one position.

Figure 7:
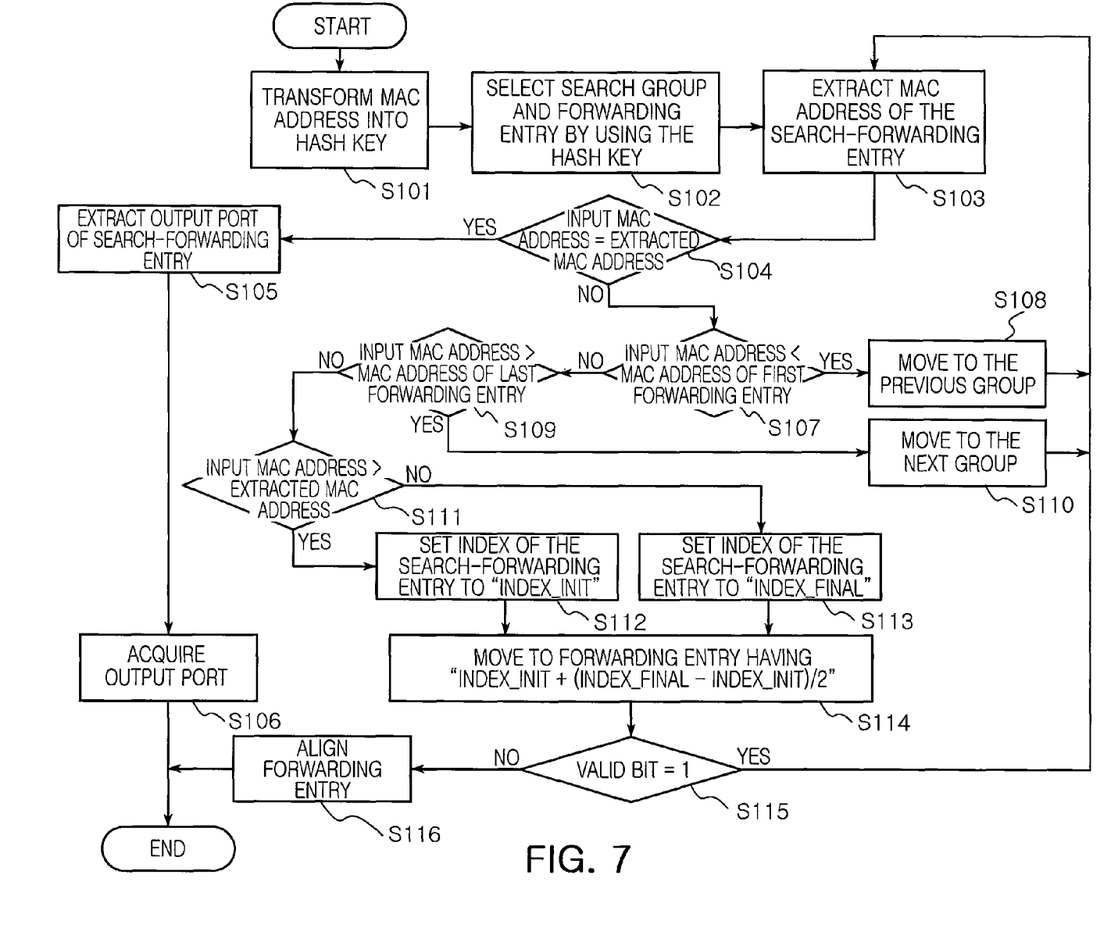
FIG. 7 is a flowchart of a method of searching for forwarding information according to an embodiment of the present invention.

FIG. 7 is a flowchart of a method of searching for forwarding information according to an embodiment of the present invention.

After transforming a MAC address in an externally input frame into a hash key (S101), a search group and a search-forwarding entry located in a search group are selected by using the hash key based on the dual hashing technique (S102).

After extracting the MAC address stored in the search-forwarding entry (S103), the MAC address is compared with the MAC address of the input frame (S104).

As a result of the comparison of operation S104, when the MAC address is the same as the MAC address of the input frame, output port information stored in the search-forwarding entry is extracted and reported, and the current process is completed (S105 and S106).

On the other hand, when the MAC address is different from the MAC address of the input frame, it is checked whether the input MAC address is less than the MAC address of a first forwarding entry in the search group (S107). When the MAC address is less than the MAC address of the first forwarding entry, the current process returns to operation S103 after moving to the previous group having a group ID value less than that of the search group by one unit (S108).

On the other hand, when the MAC address is greater than that of the first forwarding entry, it is checked whether the input MAC address is greater than the MAC address of the last forwarding entry in the search group (S109). When the input MAC address is greater than the MAC address of the last forwarding entry, the current process returns to S103 after moving to the next group having a group ID value greater than that of the search group by one unit (S110).

When the input MAC address is greater than that of the first forwarding entry and less than that of the last forwarding entry in the search group, the input MAC address is compared with the MAC address extracted in operation S103, again (S111).

As a result of the comparison, when the input MAC address is greater than the extracted MAC address, the extracted MAC address is set to an initial index value index_init (S112). When the input MAC address is less than the extracted MAC address, the extracted MAC address is set to a final index value index_final (S113).

When initializing the forwarding entry, the initial index value index_init is set to a MAC address with the least index value in the search group, and the final index value index_final is set to a MAC address with the greatest index value in the search group. However, the initial and final index values are set to the extracted MAC address, again, through operation S113.

Then, the current index index_cur is calculated according to an equation of "index_init+(index_final−index_init)/2". The forwarding entry with the calculated current index index_cur is selected (S114).

That is, a new forwarding entry is selected by dividing the search area in the search group by two.

Figure 8:
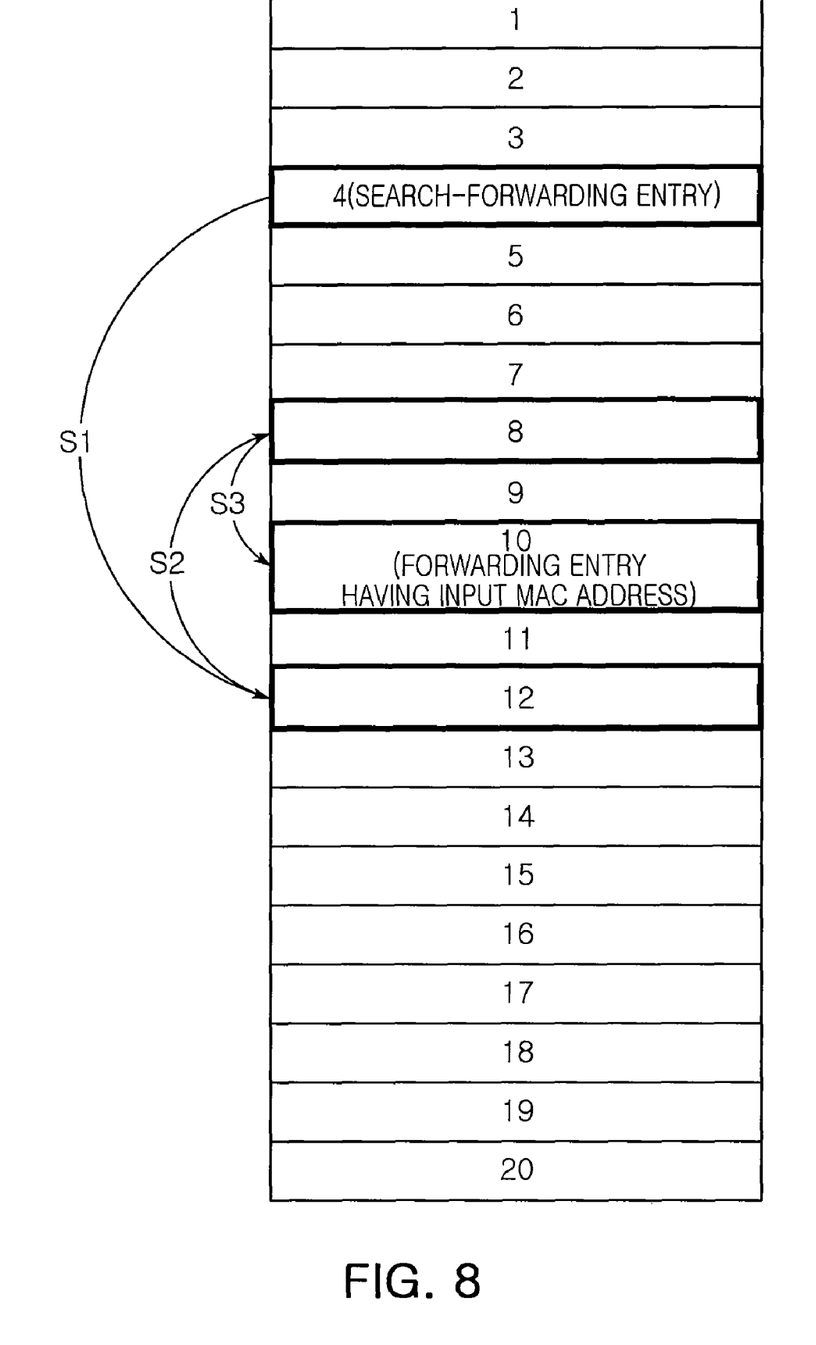
FIG. 8 illustrates an example of a method of searching for a forwarding entry using a divide-and-conquer technique according to an embodiment of the present invention.

For example, as shown in FIG. 8, although a tenth forwarding entry has the input MAC address, a fourth forwarding entry is selected. Then, in the present invention, after selecting twelfth and eighth forwarding entries dividing the search area (S1 and S2), the tenth forwarding entry is selected (S3). Accordingly, a desirable forwarding entry is selected through less numbers of searching operations.

Continuously, it is checked whether a valid bit of the forwarding entry selected in operation S114 is "1" (S115). When the valid bit is "1", it is checked that the currently selected forwarding entry is valid. The current process returns to operation S103.

On the other hand, when the valid bit is "0", it is checked that the currently selected forwarding entry is invalid. In order to add an forwarding entry having the input MAC address or to delete the currently selected forwarding entry, a process of aligning forwarding entries is performed, and the current process is completed (S116).

Figure 9:
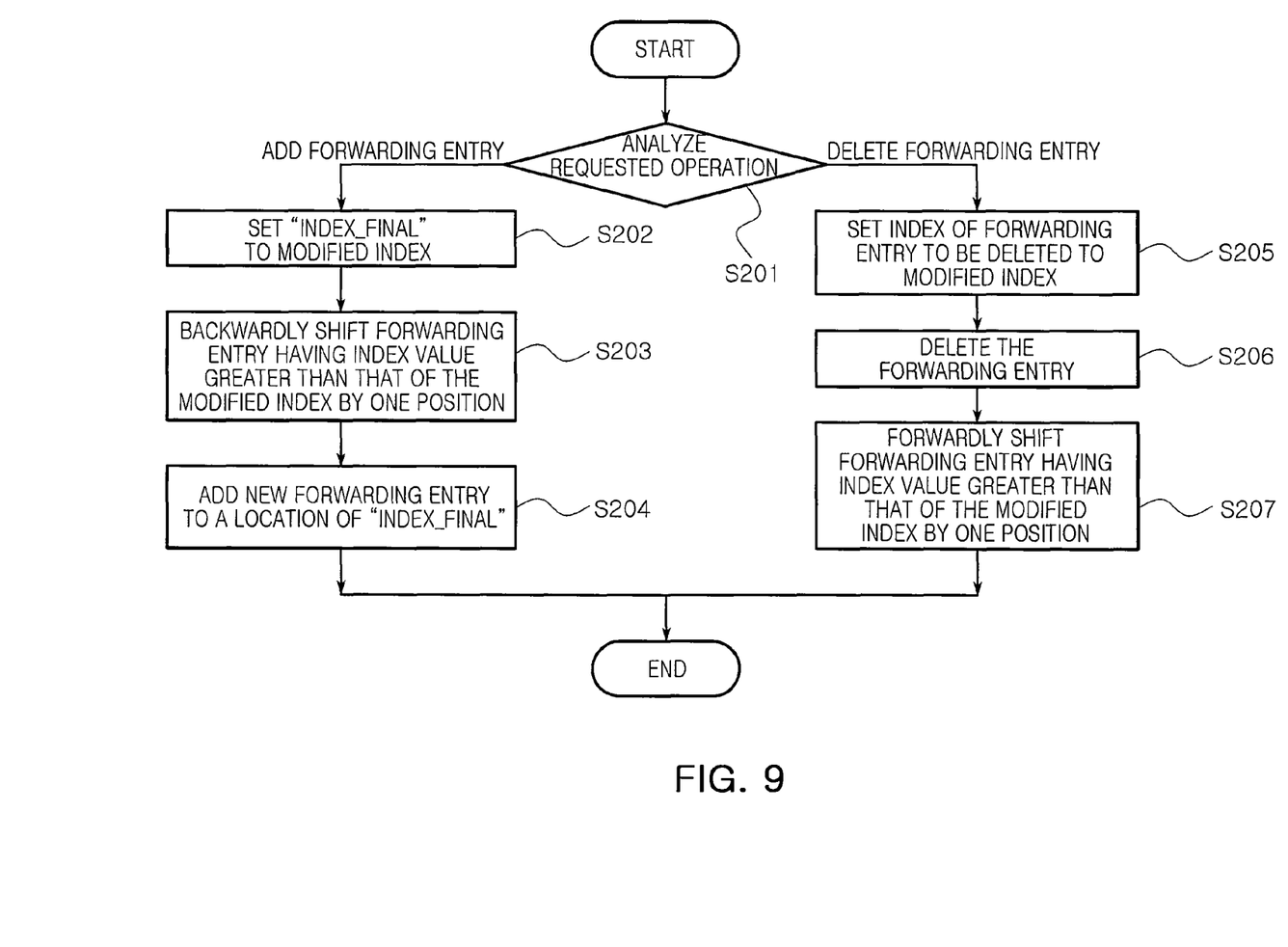
FIG. 9 is a flowchart of a method of aligning forwarding entries according to an embodiment of the present invention.

FIG. 9 is a flowchart of a method of aligning forwarding entries according to an embodiment of the present invention. In FIG. 9, forwarding entries in the forwarding table fwd_table are aligned and stored in the order of MAC address values.

First, when an operation of aligning the forwarding entries is requested and activated, it is checked whether the requested operation is an operation of adding a forwarding entry or an operation of deleting a forwarding entry (S201).

When the requested operation is the operation of adding a forwarding entry, a modified index index_modified is set to a final index value index_final (S202). After shifting a forwarding entry having an index value greater than that of the modified index index_modified by one position (S203), a new forwarding entry is added at a location of the final index value index_final (S204).

When deleting a forwarding entry located in the forwarding table fwd_table, after storing an index of the forwarding entry to be deleted in the modified index index_modified (S205), the forwarding entry is deleted (S206), and a forwarding entry having an index value greater than that of the modified index index_modified is shifted by one position (S207).

Accordingly, although a forwarding entry to be stored in a forwarding table fwd_table is added or deleted, the alignment order in the forwarding table fwd_table based on the MAC addresses is maintained.

While the present invention has been shown and described in connection with the exemplary embodiments, it will be apparent to those skilled in the art that modifications and variations can be made without departing from the spirit and scope of the invention as defined by the appended claims.

What is claimed is:

1. An apparatus for searching a forwarding table, the apparatus comprising:
    a data storage unit storing a forwarding table including:
        a plurality of search groups arranged according to MAC address values;
        a plurality of search-forwarding entries arranged according to MAC address values and stored in each search group, and
        a plurality of forwarding databases having hash keys corresponding to the search groups,
    a hashing unit configured to transform an externally input MAC address into a hash key including a first key component and a second key component, and
    a port information output unit including:
        a first comparator configured to compare the first key component of the input MAC address with a MAC address extracted from a forwarding entry in a search group to select a search group; and
        a second comparator configured to compare the second key component of the input MAC address with the MAC address extracted from a search-forwarding entry in the selected search group to select a matched search-forwarding entry,
    wherein the port information output unit outputs the output port information of the matched search-forwarding entry if the input MAC address matches the MAC address of the search-forwarding entry in the selected search group, and outputs output port information after searching and acquiring a forwarding entry having the input MAC address while dividing a search area in the search group, when the input MAC address is different from the extracted MAC address.

2. The apparatus of claim 1, wherein the second comparator includes:
    an equation comparator configured to output the output port information of the matched search-forwarding entry if the input MAC address is the same as the extracted MAC address;
    an inequality comparator configured to determine whether the input MAC address is greater or less than the MAC address of a search forwarding entry in the selected group or in the selected subgroup if the input MAC address is different from the extracted MAC address; and
    a searching location movement unit re-selecting new search-forwarding entry to be compared with the input MAC address,
    wherein when the input MAC address does not match the MAC address of the search forwarding entry in the selected search group, the second comparator divides the selected search group into a plurality of subgroups and selects a subgroup depending on whether the input MAC address is greater or less than the MAC address of the search forwarding entry, and re-compares the input MAC address with the MAC address of a search forwarding entry in the selected subgroup, and
    wherein additional sub-division of the selected subgroup is repeated until match or mismatch is declared, and when match is declared, the port information output unit outputs the output port information of the matched search-forwarding entry.

3. The apparatus of claim 2, wherein the inequality comparator searches for the new search-forwarding entry having an index index_cur that is calculated according to an equation of "index_init+(index_final−index_init)/2",
    wherein when the input MAC address is greater than the extracted MAC address, the "index_init" is set to the extracted MAC address and the "index_final" is set to the MAC address of the last search-forwarding entry included in the selected search group or the selected search subgroup, and
    wherein when the input MAC address is less than the extracted MAC address, the "index_final" is set to the extracted MAC address and the "index init" is set to the MAC address of the first search-forwarding entry included in the selected search group or the selected search subgroup.

4. The apparatus of claim 1, further comprising a forwarding entry alignment unit increasing an index value of a forwarding entry which is greater than that of an added forwarding entry by one unit, when adding the forwarding entry and decreasing the index value of the forwarding entry which is greater than that of a deleted forwarding entry by one unit, when deleting the forwarding entry.

5. The apparatus of claim 1, wherein each of the plurality of forwarding databases includes a forwarding database ID and information on a hash table indexed by using a hash key that is mapped in correspondence with a group and a forwarding entry.

6. The apparatus of claim 1, wherein each of the plurality of forwarding entries includes the MAC address, information on information validity, output port information, a virtual LAN ID, and information on a pointer for representing a location of the next forwarding entry.

7. A method of searching for forwarding information, the method comprising:
    constructing a plurality of forwarding entries which are aligned in the order of MAC address values and stored in each group after being classified into a plurality of groups and a plurality of forwarding databases having hash keys corresponding to the groups and the forwarding entries;
    transforming an input MAC address into a hash key, when the MAC address is externally input, and selecting a search group and a search forwarding entry by respectively using some bits and the other bits of the hash key;
    extracting a MAC address from the search-forwarding entry and extracting and outputting output port information of the search-forwarding entry, when the extracted address is the same as the input MAC address;
    outputting the output port information after newly searching for a forwarding entry having the input MAC address while dividing a search area in the search group, when the extracted address is different from the input MAC address; and
    aligning the forwarding entry having the input MAC address when the new search-forwarding entry is not valid, wherein the aligning of the forwarding entry includes:
determining whether to add or delete the forwarding entry having the input MAC address;
adding the forwarding entry at a location of a final index after increasing an index value of a forwarding entry which is greater than that of a modified index by one unit, when adding the forwarding entry; and
deleting the forwarding entry after setting the final index value to the modified index when deleting the forwarding entry, and decreasing the index value of the forwarding entry which is greater than that of the modified index by one unit.

* * * * *